Jan. 12, 1937.  H. E. TAUTZ  2,067,652
WOODWORKING MACHINE
Filed Aug. 4, 1934  3 Sheets-Sheet 1

WITNESSES
L. E. Kilian
C. L. Waal

INVENTOR
Herbert E. Tautz
By R. H. Caldwell
ATTORNEY

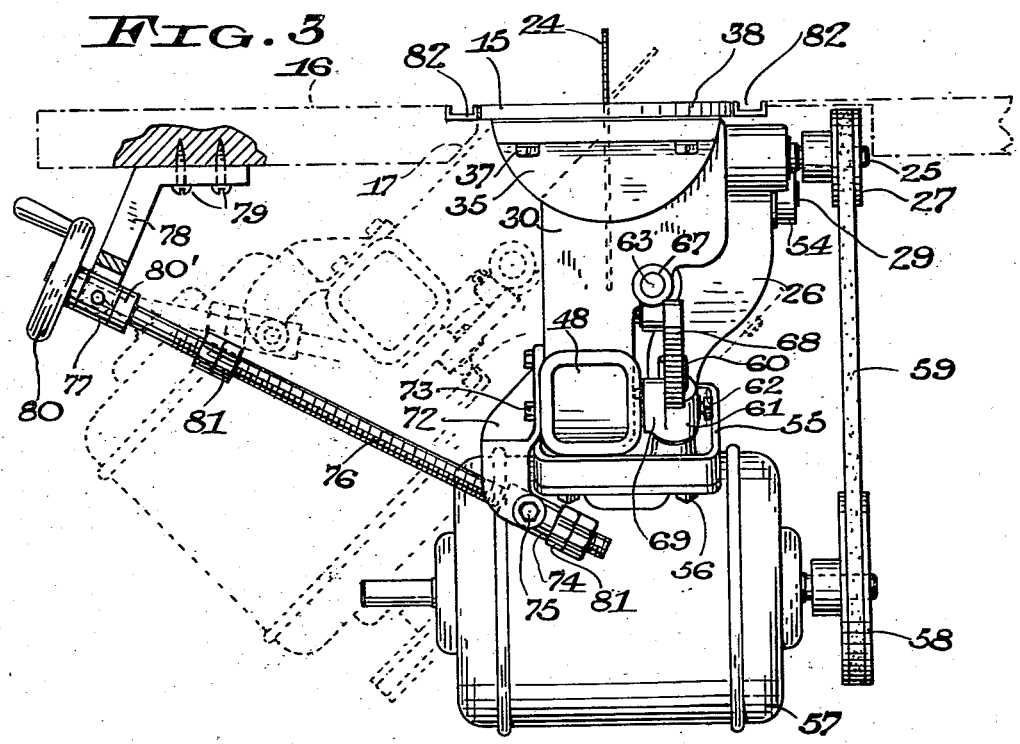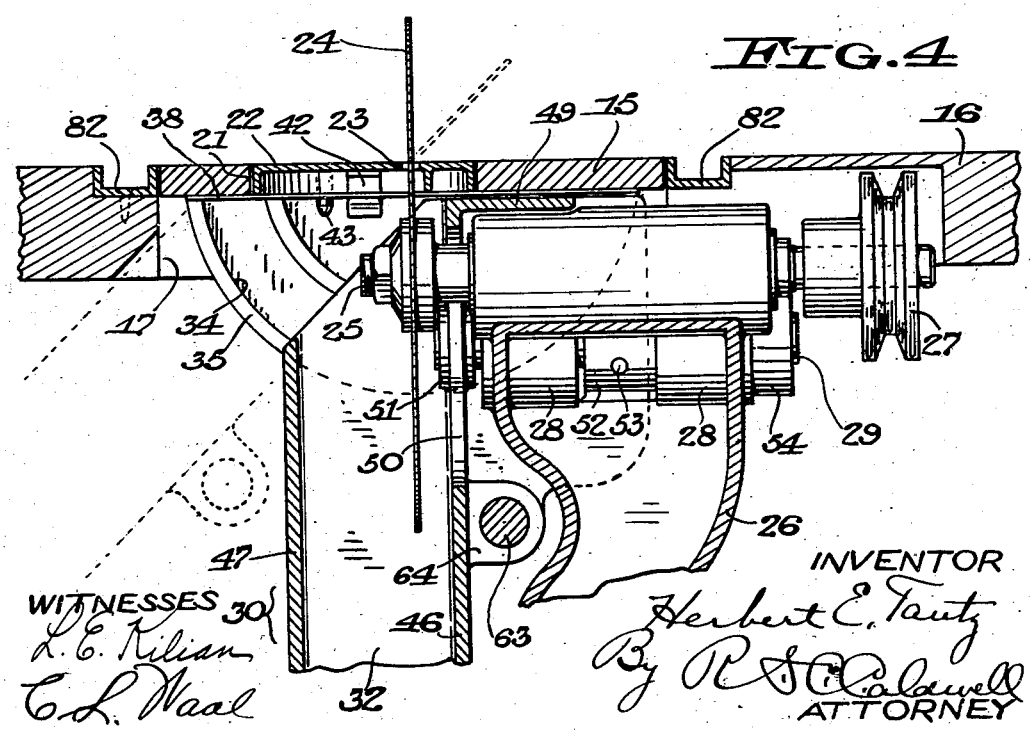

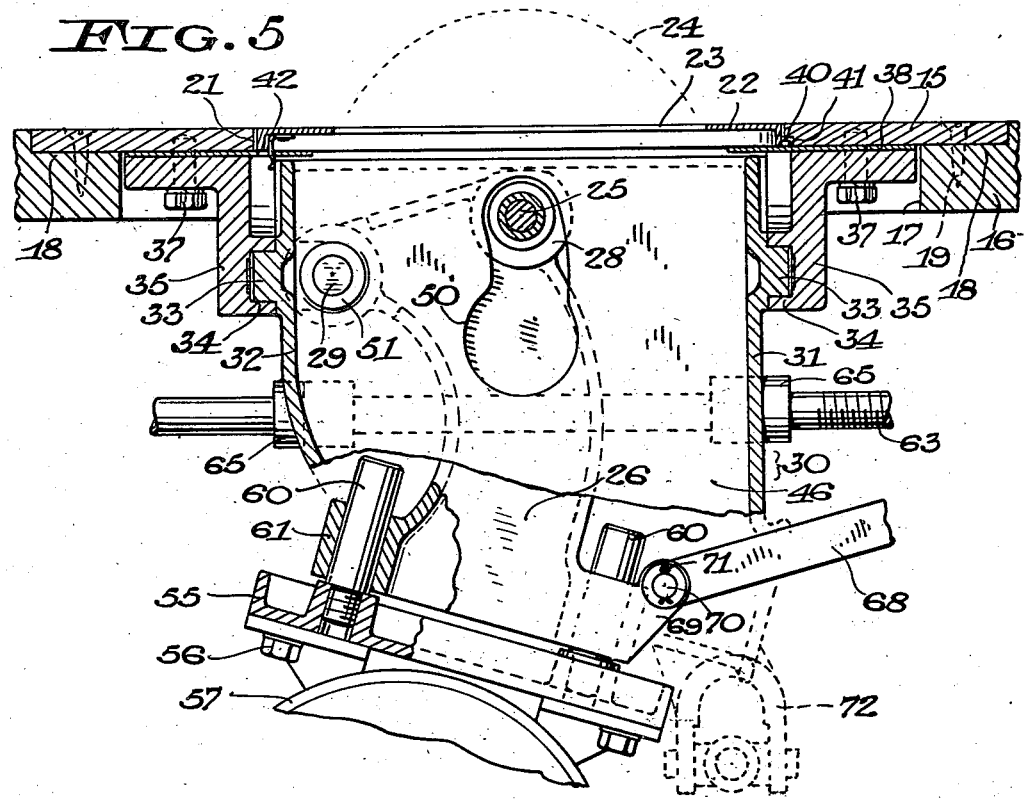

Patented Jan. 12, 1937

2,067,652

UNITED STATES PATENT OFFICE 2,067,652

WOODWORKING MACHINE

Herbert E. Tautz, Milwaukee, Wis.

Application August 4, 1934, Serial No. 738,479

5 Claims. (Cl. 143—35)

The invention relates to wood-working machines and more particularly to circular-saw machines.

An object of the invention is to provide a circular-saw structure or the like which can readily be attached by a user to a wooden work-supporting table of any desired size to suit the requirements of the user.

Another object of the invention is to provide a circular-saw machine which is so arranged as to permit economical manufacture, easy assembly, and convenient adjustment.

The invention further consists in the several features hereinafter described and claimed.

One embodiment of the invention is shown in the accompanying drawings, wherein

Fig. 3 is an end view of the machine, parts being shown in section, and dotted lines showing the position of the parts when the saw is tilted;

Fig. 4 is a sectional elevation of the upper portion of the machine, taken on the line 4—4 of Fig. 1, a tilted position of the saw being shown in dotted lines;

Fig. 5 is another sectional elevation of the upper portion of the machine, taken on the line 5—5 of Fig. 2, parts being broken away;

Fig. 6 is a top plan view of a tiltable saw housing, parts being broken away and parts being shown in section;

Fig. 7 is a top plan view of one of a pair of trunnion brackets for supporting the saw housing;

Fig. 8 is a top plan view of a sheet metal plate for supporting a slotted insert panel for the saw table, and Fig. 9 is a bottom plan view of one end portion of a mounting plate and its insert panel.

Figure 1:
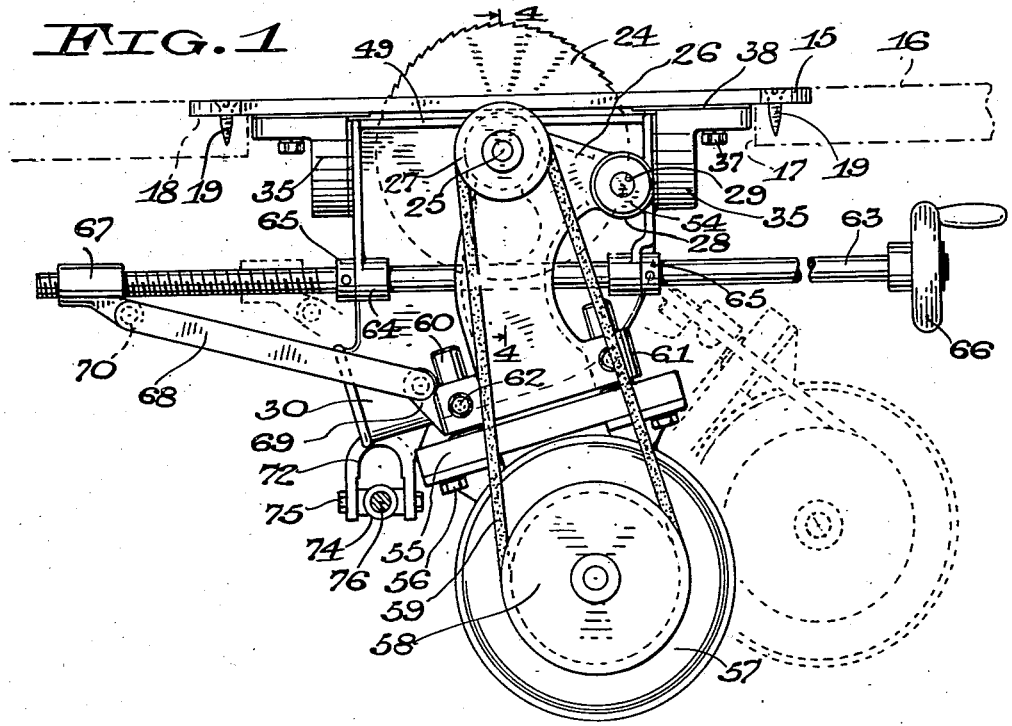
Fig. 1 is a side elevation of a circular-saw machine constructed in accordance with the invention, parts being broken away and parts being shown in section, and two different positions of a swingable saw support being shown in full lines and dotted lines.
Figure 2:
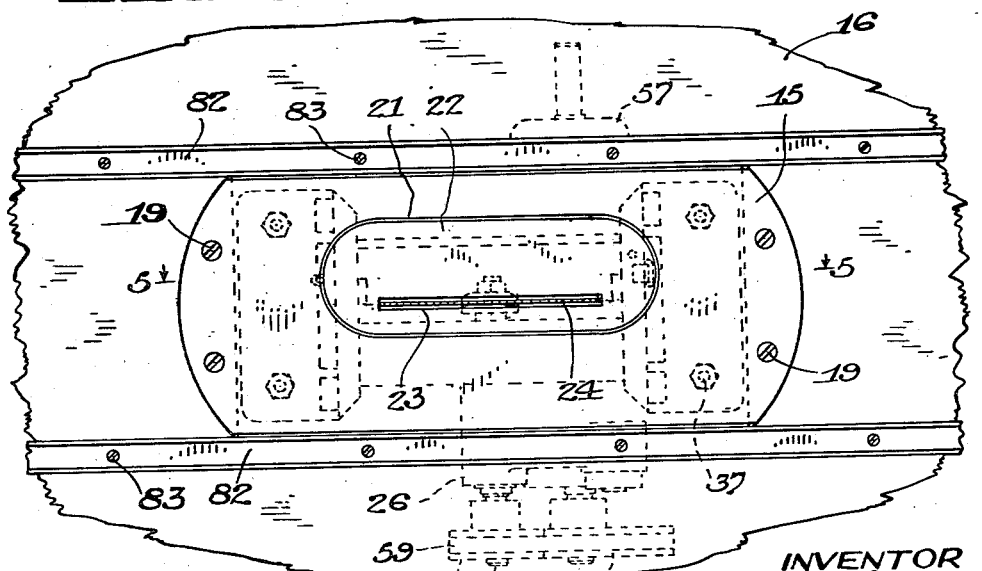
Fig. 2 is a top plan view of the machine, parts of the saw-table being broken away.

In these drawings, 15 designates a flat horizontal mounting plate having parallel opposite sides and preferably having rounded opposite ends. The mounting plate is of metal and is intended to be secured to a wooden saw-table 16 of any suitable size, the plate covering an opening 17 in the table and being flush with the upper face of the table to form a work-supporting surface. The end portions of the plate 15 are set into rabbets 18 in the table and are fastened to the table by screws 19 passing through bores 20 in the plate.

An elongated opening 21 is formed in the mounting plate and receives therein in flush relation an insert plate or panel 22 having a slot 23 extending parallel to the side edges of the mounting plate to admit the upper portion of a circular-saw 24. The insert plate is preferably formed by a soft metal die-casting.

The saw 24 is carried on an arbor 25 rotatably mounted in a swingable member 26 and having a drive pulley 27 at its outer end, the saw-table being suitably recessed to clear the pulley. The member 26 is of hollow cross-section and has a pair of axially spaced hubs 28 pivotally carried on a rod or shaft 29 parallel to the saw arbor and secured to a tiltable metal frame or housing 30 forming a sawdust chute. The frame or housing 30 has opposite end walls 31 and 32 which have respective arcuate ribs 33 formed thereon and movably fitting in laterally opening arcuate grooves 34 formed in metal trunnion brackets 35. The trunnion brackets have openings 36 receiving screws 37 by which the brackets are secured to the under side of the mounting plate 15. The brackets define for the tiltable frame or housing a pivotal axis which preferably lies in the plane of the saw 24 and which preferably lies substantially in the plane of the top surface of the mounting plate 15.

Sheet metal plates 38 are clamped between the brackets 35 and the mounting plate to form supports for the insert panel 22 and are provided with openings 39 to pass the screws 37. The plates 38 extend over the upper edges of the end walls of the housing 30, so as to direct the passage of sawdust into the housing and to minimize deposit of sawdust between the brackets and these end walls.

At one end of the opening 21 in the mounting plate a notch or recess 40 is formed in the bottom face of the plate to receive and retain a lug 41 on the corresponding end of the insert panel. At its other end the insert panel is provided with a resilient retaining clip 42 and positioning pin 43 to enter respective openings 44 and 45 formed in the adjacent sheet metal plate 38.

The tiltable frame or housing 30 has parallel side walls 46 and 47 between which the saw is located, and the bottom of the frame or housing slopes to a discharge opening 48 (Fig. 3) adjacent the end wall 31. At its upper portion the frame or housing is cut away at one side, as seen in Fig. 4, to permit tilting of the frame. The upper portions of the end walls 31 and 32 are extended beyond the side wall 46 to form end flanges which are connected at their upper edges by a flange 55

49 also merging with the upper edge of the side wall 46, thus insuring rigidity. The saw arbor passes through an elongated aperture 50 in the side wall 46, the lower end of the aperture being enlarged to admit the arbor.

The rod or shaft 29 is supported at spaced points in a boss 51 formed on the frame side wall 46 and in a lug 52 formed on the frame end wall 32, the rod being anchored in place by a cross pin 53 (Fig. 4) passing through the lug and engaging the rod. The hubs 28 of the arbor-supporting member 26 are mounted on the rod and straddle the lug 52. A collar 54 on the outer end of the rod confines the member 26 against lateral shifting on the rod.

A ribbed plate 55 is adjustably carried by the lower end of the swingable member 26 and has secured thereto by screws 56 an electric motor 57. The motor shaft has a pulley 58 which is drivingly connected to the saw arbor pulley 27 by a V-belt 59. The tension on the belt is adjusted by shifting the plate 55 which, in the present instance, is provided with parallel studs 60 slidably fitting in apertured lugs 61 formed on the lower end of the frame 26, the studs being secured in adjusted position in the lugs by set screws 62.

A horizontal shaft 63 is journalled in spaced lugs 64 formed on the side wall 46 of the tiltable frame 30 and projects beyond each end of the frame, the shaft extending parallel to the tilting axis of the frame 30 and being retained against axial movement by collars 65 engaging the lugs. One end of the shaft is provided with a hand-wheel 66. The other end of the shaft, which is screw-threaded, carries a nut or traveller 67 which is connected by a link 68 with a lug 69 formed on the lower end of the swingable member 26, the link having pivot pins 70 at opposite ends retained in place by cotter pins 71. By turning the hand-wheel 66, the nut 67 is caused to move along the shaft, thereby shifting the swingable member 26 to adjust the projection of the circular saw above the table. The axis of the shaft 63 remains fixed with respect to the frame 30 in all adjusted positions of the swingable member 26.

Means are also provided for adjusting the angle of the saw with respect to the saw-table. In the present instance, a forked bracket 72 is secured by screws 73 to the lower portion of the side wall 47 of the tiltable frame or housing 30. An internally screw-threaded sleeve 74 is transversely trunnioned in the bracket 72 by screws 75 and is engaged by a threaded shaft 76 which is inclined and may extend toward either side of the saw-table. Near its outer end the shaft 76 is journalled in a bearing 77 having a swingable mounting on a bracket 78 secured by screws 79 to any suitable part of the saw-bench, such as the underside of the saw-table. A hand-wheel 80 on the outer end of the shaft 76 serves to turn the shaft and thus adjust the angle of the saw, the bearing 77 being placed between the hand-wheel 80 and a collar 80′ on the shaft. The shaft 76 is preferably provided with stop nuts 81 to engage the sleeve 74 and thereby predetermine angular positions of the saw, such as the vertical position and a position 45° from the vertical.

In order to provide durable guides for a slidable gauge, a pair of parallel upwardly opening metal channel bars 82 are let into the wooden saw-table 16 near and parallel to opposite side edges of the mounting plate 15 and are secured to the saw-table by screws 83.

In mounting the circular-saw it is only necessary for the user to construct a saw-bench with a wooden saw-table 16 of any desired size having recesses to receive the mounting plate 15 and channel bars 82, and to secure the parts in place. The mounting plate 15 is detached from the housing 30 and is used as a guide for cutting the opening 17 and rabbets 18 in the saw-table. The mounting plate is then secured to the saw-table, and the housing brackets 35 are subsequently attached to the plate. The channel bars 82 are cut off to suit the length of the table. The shaft 76 may extend toward either side of the table to suit the convenience of the user.

Since the saw arbor and motor are both carried by the same shiftable member, the belt tension and relative position of the pulleys are not disturbed when the saw adjustments are effected, and the user has unobstructed access to all sides of the saw-table.

The rounded shape of the mounting plate ends and the table-rabbets prevents catching of the front edge of the work as the work is fed to the saw.

The metal channel bars 82 and their relation to the saw-table and power saw unit form subject-matter described and claimed in my co-pending application for Saw tables, Serial No. 37,153, filed August 21, 1935; and, the mounting and angular adjustment of the power saw unit mounting plate with respect to the table form subject-matter described and claimed in my co-pending application for Saw mountings, Serial No. 37,154, filed August 21, 1935.

What I claim as new and desire to secure by Letters Patent is:

1. In a wood-working machine, the combination of a top member having a cutter opening, a frame tiltably carried by said top member, a cutter arbor, an arbor-supporting member swingably carried by said frame for raising and lowering said arbor, and a rotary shaft journalled in said frame and extending along an axis fixed with respect to said frame, said shaft being confined against longitudinal movement and having a screw-and-link connection with said swingable member for adjusting the angular position of said swingable member.

2. In a wood-working machine, the combination of a top member having an aperture, an insert panel in said aperture having a cutter opening, cutter-supporting means including a pair of brackets secured below said top member and an open-top cutter housing carried by said brackets, and plates clamped between said top member and brackets for supporting said insert panel, said plates extending over the upper edges of said housing.

3. In a wood-working machine, the combination of a top member having a cutter opening, an arbor having a cutter, a shiftable member for carrying said arbor, a tiltable member for supporting said shiftable member and carried by said top member, means for displacing said tiltable member to adjust the angle of the cutter with respect to said top member, a rotatable shaft carried by said tiltable member, said shaft being restrained against longitudinal movement and having an axis fixed with respect to said tiltable member and extending substantially parallel to the tilting axis of said tiltable member in all positions of said shiftable member, and means connecting said shaft and shiftable member for raising and lowering the arbor carried by said shiftable member.

4. In a wood-working machine, the combination of a top member having a saw opening, a swingable saw housing below said top member having opposite end walls provided at their outer sides with arcuate bearing surfaces, said housing having an apertured wall connecting said end walls, brackets secured below said top member and forming supports for said housing bearing surfaces to define for said housing a pivotal axis lying substantially in the top plane of said top member, a saw arbor extending through said apertured wall, and an arbor-supporting member shiftably carried by said housing.

5. In a wood-working machine, the combination of a top member having a saw opening, a saw housing below said top member having opposite side walls and opposite end walls, one of said side walls being apertured, said end walls at their outer sides having arcuate bearing surfaces, spaced brackets secured to the underside of said top member and forming supports for said housing bearing surfaces to define for said housing a pivotal axis lying substantially in the top plane of said top member, a saw arbor extending through said apertured side wall, and an arbor-supporting member having a swingable mounting on said housing on an axis parallel to the arbor axis to vary the elevation of the saw, said mounting including a pivot member carried by one of said end walls and one of said side walls.

HERBERT E. TAUTZ.